(12) United States Patent
Severinsson

(10) Patent No.: US 7,401,686 B2
(45) Date of Patent: Jul. 22, 2008

(54) DEVICE IN A VEHICLE BRAKE ARRANGEMENT

(75) Inventor: Lars Severinsson, Hishult (SE)

(73) Assignee: Haldex Brake Products AB (SE)

( * ) Notice: Subject to any disclaimer, the term of this patent is extended or adjusted under 35 U.S.C. 154(b) by 897 days.

(21) Appl. No.: 10/722,938

(22) Filed: Nov. 26, 2003

(65) Prior Publication Data

US 2004/0154877 A1    Aug. 12, 2004

Related U.S. Application Data

(63) Continuation of application No. PCT/SE02/00974, filed on May 22, 2002.

(30) Foreign Application Priority Data

May 30, 2001    (SE)    .................................... 010885

(51) Int. Cl.
*F16D 66/00* (2006.01)
(52) U.S. Cl. ................................. 188/1.11 E
(58) Field of Classification Search ................. 188/72.1, 188/72.8, 71.8, 72.7, 156, 158, 162, 1.11 R, 188/1.11 E; 73/121, 128, 862.642, 862.381, 73/862.57, 862.636; 303/3, 20, 113.4, 155; 318/14, 563, 646; 701/70, 80; 60/534, 545; 91/1, 376 R, 369.2; 310/338
See application file for complete search history.

(56) References Cited

U.S. PATENT DOCUMENTS

| | | | | |
|---|---|---|---|---|
| 4,395,883 A | * | 8/1983 | Melinat | 60/545 |
| 4,602,702 A | * | 7/1986 | Ohta et al. | 188/72.1 |
| 4,623,044 A | * | 11/1986 | Ohta et al. | 188/72.1 |
| 4,784,442 A | * | 11/1988 | Petersen | 303/15 |
| 4,818,036 A | * | 4/1989 | Reinecke | 303/50 |
| 4,953,669 A | * | 9/1990 | Severinsson | 188/171 |
| 5,126,617 A | * | 6/1992 | Lukasiewicz et al. | 310/338 |
| 5,410,911 A | * | 5/1995 | Severinsson | 73/128 |
| 5,445,441 A | * | 8/1995 | Inagawa et al. | 303/10 |
| 5,563,355 A | * | 10/1996 | Pluta et al. | 73/862.625 |
| 5,586,814 A | * | 12/1996 | Steiner | 303/116.2 |
| 5,658,055 A | * | 8/1997 | Dieringer et al. | 303/114.3 |
| 5,739,626 A | * | 4/1998 | Kojima et al. | 310/338 |
| 6,000,507 A | * | 12/1999 | Bohm et al. | 188/158 |
| 6,176,352 B1 | | 1/2001 | Maron et al. | 188/156 |
| 6,230,854 B1 | * | 5/2001 | Schwarz et al. | 188/156 |
| 6,405,836 B1 | * | 6/2002 | Rieth et al. | 188/72.1 |
| 6,598,714 B1 | * | 7/2003 | Rinsma et al. | 188/71.9 |
| 6,705,435 B2 | * | 3/2004 | Severinsson | 188/72.8 |
| 2004/0163900 A1 | * | 8/2004 | Beuerle et al. | 188/72.1 |
| 2004/0195055 A1 | * | 10/2004 | Gilles | 188/73.1 |

FOREIGN PATENT DOCUMENTS

| | | | |
|---|---|---|---|
| DE | 196 52 230 A1 | | 6/1998 |
| EP | 0 334 435 | | 9/1992 |
| JP | 60-143173 | * | 7/1985 |
| WO | WO 99/37939 | | 7/1999 |
| WO | WO 02/096733 A1 | * | 12/2002 |

* cited by examiner

*Primary Examiner*—Thomas J Williams
(74) *Attorney, Agent, or Firm*—St. Onge Steward Johnston & Reens LLC

(57) ABSTRACT

A device in a vehicle brake arrangement for determining the applied brake force comprises an enclosed elastically deformable medium (20), on which the reaction force from the brake force is to act. An axially movable push rod (22) is in contact with the medium (20) for transmitting a force therefrom, and sensor means (26; 28) are provided for sensing the force in the push rod.

7 Claims, 2 Drawing Sheets

DEVICE IN A VEHICLE BRAKE ARRANGEMENT

This application is a continuation of pending International Patent Application No. PCT/SE02/00974 filed May 22, 2002, which designates the United States and claims priority of pending Swedish Application No. 010885-2 filed May 30, 2001.

FIELD OF THE INVENTION

The present invention relates to a device in a vehicle brake arrangement for determining the applied brake force, comprising an enclosed elastically deformable medium, on which the reaction force from the brake force is to act.

BACKGROUND OF THE INVENTION

It is well known in the art that it is important in for example a brake applied by a rotating electric motor to obtain a signal corresponding to the applied brake force in order to be able to control the rotation of the motor and thus the brake application in a desirable fashion.

Examples of prior devices for this purpose are shown in EP-B-0 334 435, DE-A-196 52 230, and WO-A-9937939.

A recognized problem with devices of this nature is that the heat in the brake arrangement due to its operation may cause difficulties both with the physical properties of the used sensor means and the accuracy of their outputs.

The main object of the invention is thus to obviate this problem.

THE INVENTION

For this and other reasons a device according to the invention is characterized in that an axially movable push rod is in contact with the medium for transmitting a force therefrom and that sensor means are provided for sensing the force in the push rod.

By the provision of a force-transmitting push rod the sensor means may be positioned in a portion of the brake arrangement where the heat is not a major problem and where also for other reasons it may be more advantageous to position the sensor means.

The dependent claims relate to advantageous details of the device.

BRIEF DESCRIPTION OF THE DRAWINGS

The invention will be described in further detail below under reference to the accompanying drawings, in which.

DETAILED DESCRIPTION OF EMBODIMENTS

Figure 1:
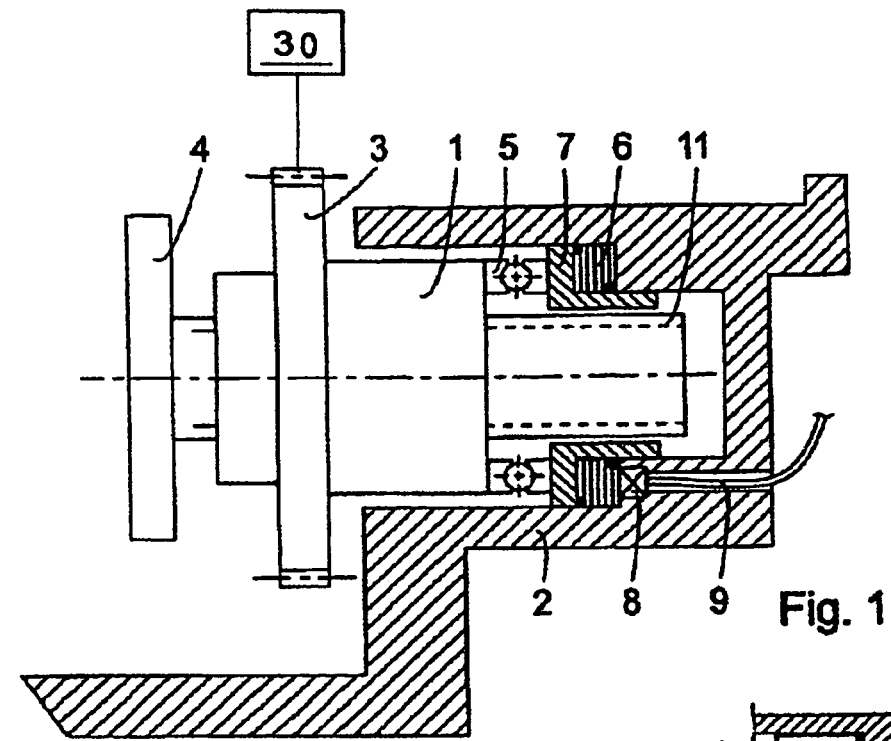
FIG. 1 is a very schematic, partly sectional side-view of a first disc brake arrangement with a force sensing device.

FIG. 1 shows a portion of a disc brake for a heavy road vehicle as for example shown in FIG. 1 in PCT/SE00/02402. In this disc brake a thrust rod 1 is arranged in a housing 2. A rotative movement for brake application is imparted to a thrust rod gear 3 from an electric motor 30 via transmission means (not shown). The thrust rod 1 has means for transferring this rotating movement into an axial, brake-applying movement of a brake pad attachment plate 4. The thrust rod 1 is supported in the housing 2 by an axial bearing 5, which transfers the reaction force at a brake application to the housing 2.

This reaction force to the brake force is here transmitted over an annular pressure-transmitting medium 6, preferably of rubber, enclosed by a flanged ring 7 in contact with the axial bearing 5. A pressure sensor 8 is in contact with the medium 6 and supplies in an electric line 9 an electric signal indicative of the pressure in the medium 6. Alternatively, the pressure sensor 8 may be embedded in the medium 6.

The signal transmitted from the pressure sensor 8 may be used to stop the brake application by means of the electric motor 30 when a desired brake force has been attained.

Figure 3:
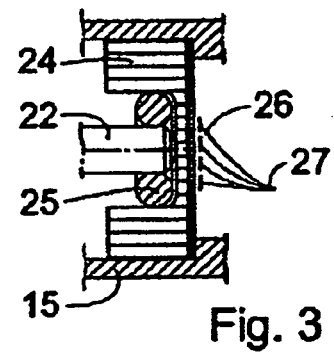
FIG. 3 is a side-view to a larger scale of the portion to the right in FIG. 2 of the force sensing device.
Figure 2:
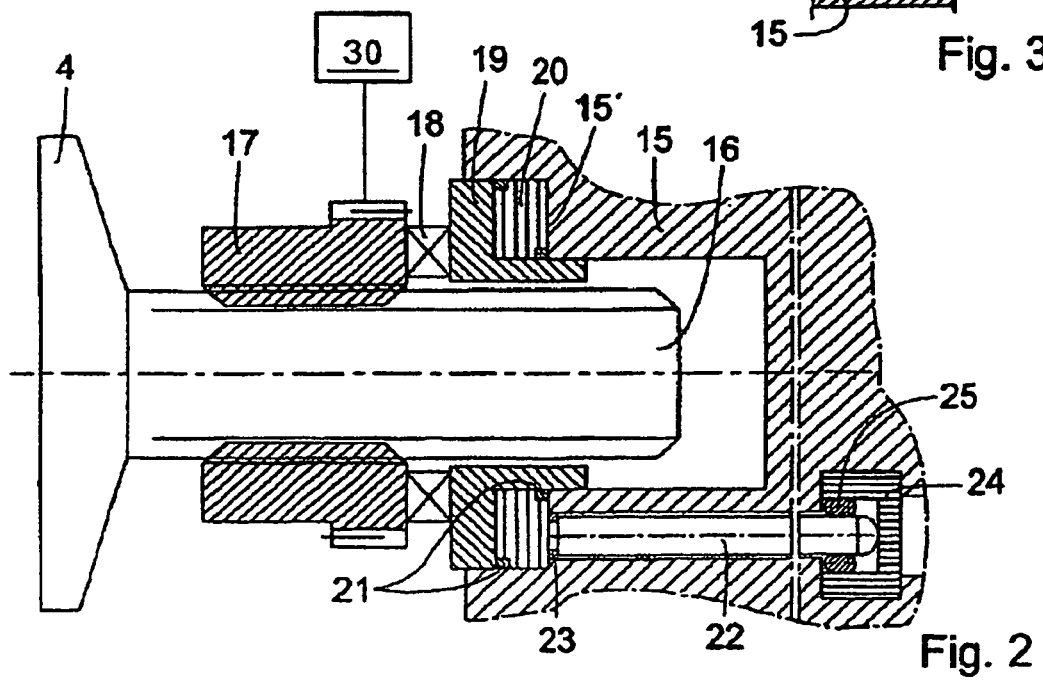
FIG. 2 is a very schematic, partly sectional side-view of a second disc brake arrangement with a force sensing device.

The disc brake embodiment shown in FIGS. 2 and 3 corresponds in a simplified form to that of FIG. 6 in the above mentioned international patent application. The following main members may be recognized herefrom: a disc brake caliper housing 15, a thrust rod spindle 16, a nut member 17, an axial bearing 18, and a ring 19. For a fuller description of the disc brake, reference is made to the international patent application.

It is here sufficient to note that the reaction force at a brake application is applied to the right in the drawing on the ring 19, which here is flanged. This force is transmitted to a housing abutment 15' via an annular pressure-transmitting medium 20, preferably of rubber, provided with sealing rings 21 for preventing the medium 20 to be pushed out between the housing 15 and the ring 19. The medium 20 may be defined as "an enclosed elastically deformable medium".

A push rod 22 is axially movably arranged in a corresponding bore in the housing 15 and is in contact at its left end with the medium 20 over a portion with reduced diameter surrounded by a sealing ring 23, for example made of Teflon® polytetrafluoroethylene, possibly with an additive.

At its opposite end the push rod 22 is in contact with a force-receiving cup 24. The push rod 22 may here be surrounded by a guiding and centering O-ring 25, which does not transmit any forces. By the fact that the push rod 22 has a rounded end, the contact area with the cup 24 is very small. In the region of the engagement of the push rod 22 with the cup 24, which may be made of a ceramic material, the cup may be provided with an integrated sensor element 26 indicated in FIG. 3. Signals indicative for the force applied by the push rod 22 and thus the pressure in the medium 20 may be transmitted from the sensor element 26 via electric lines 27.

It is thus evident that the pressure in the pressure-transmitting medium 20 is transformed into a force in the push rod 22 and transmitted to a place outside the area of the construction where high temperatures may cause hazards for the equipment and lead to uncertain results.

Figure 4:
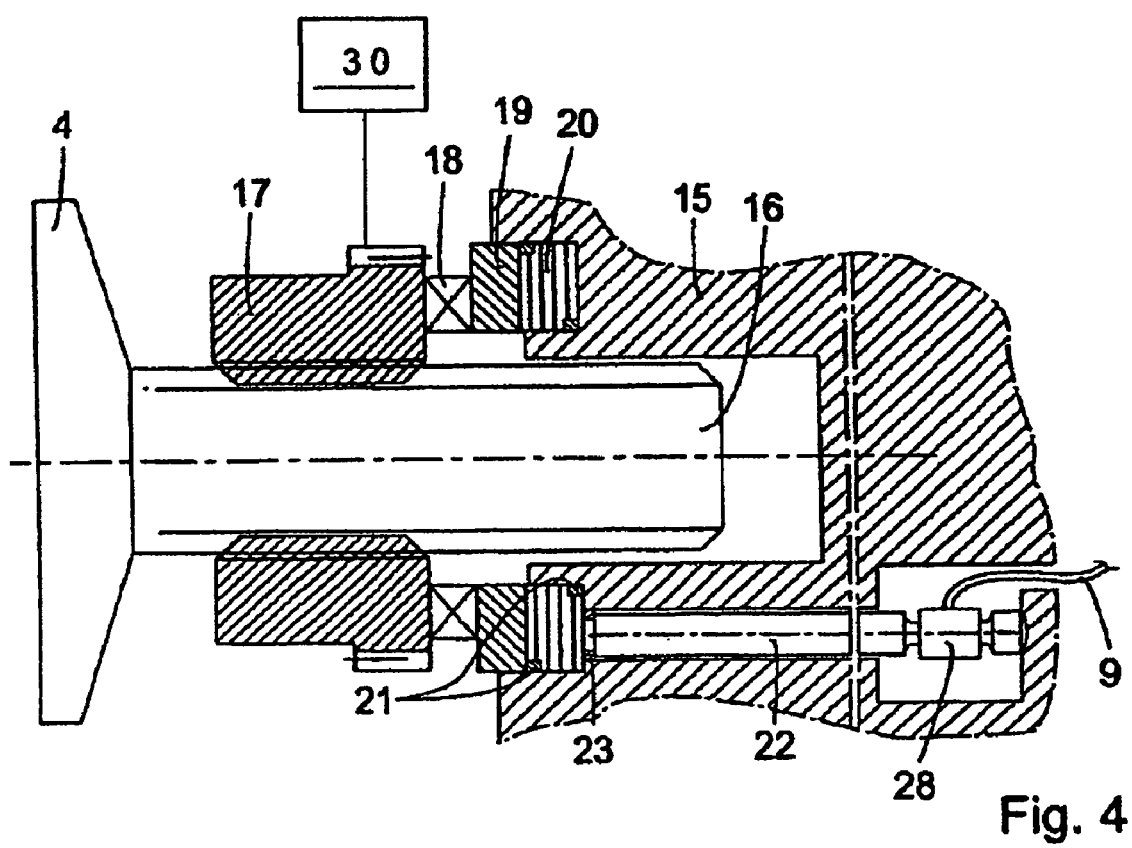
FIG. 4 shows an alternative embodiment to the one of FIG. 2.

An arrangement with certain modifications in relation to that of FIG. 2 is shown in FIG. 4. Similar parts have the same reference numerals as in FIG. 2.

In this arrangement the annular pressure-transmitting medium 20 can be placed in an annular groove in the brake caliper housing 15 and be acted on by the ring 19. Sealing can be provided by sealing rings 21.

Further, in this arrangement the push rod 22 may in itself be rigidly supported by the housing 15 and along its length be provided with a force-sensing means 28. This force-sensing means 28 may be an integrated portion of the push rod 22 or be connected in the rod.

In the shown and described devices the pressure in the annular pressure-transmitting medium 20 is further transmitted as a force in the push rod 22 in the axial direction of the thrust rod spindle 16. However, as the pressure is uniformly distributed in the medium 20, the push rod 22 may have any suitable direction in relation to the thrust rod spindle 16.

It is within the scope of the appended claims to make use of a push rod linkage instead of just a single push rod. The purpose of such a linkage would for example be to transfer the force to any suitable place for the sensor means.

The pressure-transmitting medium 20 is preferably rubber, but other materials are conceivable. The medium shall generally speaking be plastically deformable, like a hydraulic fluid.

In order to assure very precise results, several arrangements of the kind shown in FIGS. 2-4 may be provided in a single disc brake, for example one for each thrust rod, when a disc brake is provided with more than one such thrust rod. Their results may be added and a mean value calculated. It may, however, be sufficient to have only one arrangement as shown.

What is claimed is:

1. A device in a vehicle brake arrangement for determining an applied brake force, comprising an electric motor, a thrust rod gear driven by the motor, a thrust rod that applies a brake force when the gear is driven, an enclosed elastically deformable medium, on which a reaction force from the brake force is to act, and a force sensor located remotely from the elastically deformable medium, characterized in that an axially movable push rod is in contact with the medium, which axially moveable push rod transmits a force from the elastically deformable medium to the remotely located force sensor, which sensor transmits a signal to the electric motor that causes the motor to stop the application of brake force when a desired amount of force has been attained.

2. A device according to claim 1, characterized in that the force sensor comprises a fixed force-receiving cup, in which the end of the push rod opposite the medium engages and which is provided with a sensor element for the engagement with the push rod.

3. A device according to claim 2, characterized in that the push rod in the region for its engagement with the force-receiving cup is provided with a guiding and centering O-ring.

4. A device according to claim 2, characterized in that the push rod is rigidly supported by a housing and along its length is provided with a force-sensing means.

5. A device according to claim 4, characterized in that the force-sensing means is an integrated portion of the push rod or connected therein.

6. A device according to claim 5, characterized in that the push rod has a portion with reduced diameter in contact with the pressure-transmitting medium, said portion being surrounded by a sealing ring.

7. A device according to claim 6, characterized in that the brake force is transmitted the pressure-transmitting medium by a ring.

\* \* \* \* \*